United States Patent [19]
Fry

[11] 3,812,431
[45] May 21, 1974

[54] DEVICE FOR COMPARING THE MAGNITUDES OF ELECTRICAL QUANTITIES

[75] Inventor: Peter William Fry, Dorchester, England

[73] Assignee: Integrated Photomatrix Limited, Dorchester, England

[22] Filed: July 25, 1972

[21] Appl. No.: 274,899

[30] Foreign Application Priority Data
July 26, 1971   Great Britain.................. 34983/71

[52] U.S. Cl................ 328/137, 250/209, 307/232, 307/235, 324/111, 324/140, 328/146, 328/147
[51] Int. Cl. ........................................ H04q 3/00
[58] Field of Search ........... 250/209; 307/232, 235; 328/146, 147, 137; 324/111

[56] References Cited
UNITED STATES PATENTS
| | | | |
|---|---|---|---|
| 2,848,685 | 8/1958 | Mondschein | 324/140 R |
| 3,646,457 | 2/1972 | David et al. | 328/147 |
| 3,721,839 | 3/1973 | Shannon | 307/311 |
| 3,631,352 | 12/1971 | Kelley et al. | 328/147 |
| 3,409,830 | 11/1968 | Phillips | 328/147 |
| 3,341,816 | 9/1967 | Davis et al. | 328/147 |

Primary Examiner—Rudolph V. Rolinec
Assistant Examiner—William D. Larkins
Attorney, Agent, or Firm—Burns, Doane, Swecker & Mathis

[57] ABSTRACT

A device for comparing the magnitudes of a plurality of small currents such as photocurrents through photodiodes comprises capacitors which are arranged to be pre-charged from a voltage supply and then simultaneously discharged by respective ones of the currents to be compared, whereby the voltage of each capacitor during discharge varies at a rate which is significant of the magnitude of the respective current. The voltage of each capacitor is detected by a bistable circuit or trigger circuit which produces an output signal when such voltage drops to a predetermined value. On production of an output signal by one of the detection circuits, a control circuit operates to recharge all the capacitors to prevent a subsequent output signal from another detection circuit.

5 Claims, 1 Drawing Figure

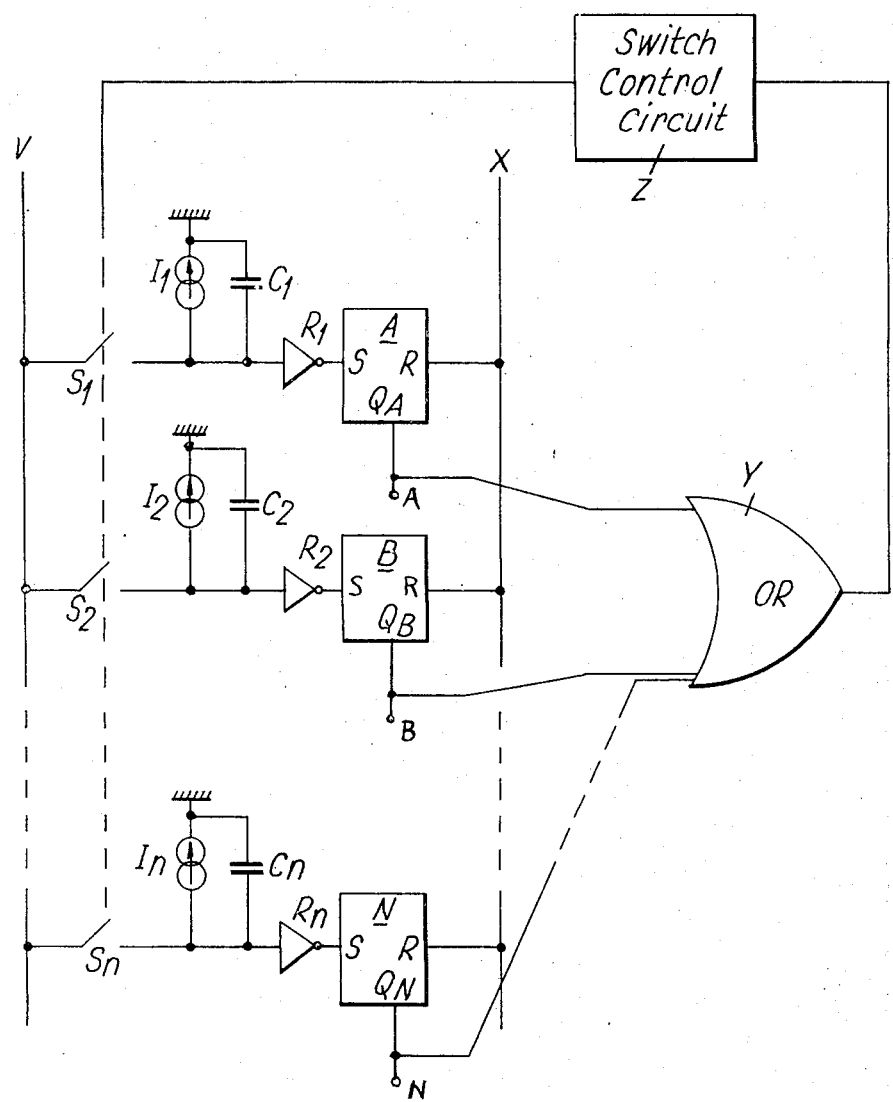

DEVICE FOR COMPARING THE MAGNITUDES OF ELECTRICAL QUANTITIES

This invention relates to a device for comparing the magnitudes of electrical quantities.

Broadly, the invention provides a device for comparing the magnitudes of first and second electrical quantities, comprising means to provide simultaneously first and second electrical signals which vary (increase or decrease) at a rate significant of the magnitudes of the first and second electrical quantities respectively, first and second detection means to detect the first and second signals respectively, each such detection means having an output at which an output signal is produced when the respective one of the first and second signals attains a predetermined value, and means connected to the outputs of the first and second detection means and operative, on receipt of an output signal from one of the detection means, to prevent a subsequent output signal being produced by the other detection means.

A device embodying the invention is particularly useful for comparing small electrical quantities (e.g. small values or current) or electrical quantities which have only small differences in magnitude, such comparison often being difficult or impossible to effect by a direct measurement of the quantities to be compared since the margins of error in the read-out instruments are often relatively large, providing insufficient resolution. However, the time response of an electronic circuit can be very fast and by effectively converting a difference in magnitude to a time interval even very small electrical quantities can be compared.

In one particular form of device according to the invention, the first and second electrical quantities are currents and the first and second electrical signals are voltages. Thus, the detection means which produces the output signal indicates which of the currents is the greater or smaller, the other detection means being prevented from producing a subsequent output signal.

Advantageously, the first and second voltages are produced by using the first and second currents to charge or discharge respective capacitors.

A device embodying the invention may be used to compare electrical resistances. In a preferred embodiment of device for this purpose, the first and second electrical quantities are resistances, and the first and second electrical signals are voltages which are produced by charging or discharging respective capacitors through the first and second resistances simultaneously.

Such a device is particularly suitable for comparing the resistances of photodiodes, thereby to compare the intensity of illumination incident on each diode.

Preferably, the means to prevent a subsequent output signal being produced comprise control means operative to reset the device, by fully charging or discharging the capacitors, on receiving the output signal from the said one detection means.

The first and second detection means may each include a bistable circuit whose output state changes to produce the output signal when the respective voltage attains the said predetermined value.

Advantageously, the output of each bistable circuit is connected to a respective input of an OR gate the output of which is connected to the reset means.

As an alternative to the bistable circuit mentioned above, the first and second detection means may each include a trigger circuit the output state of which changes when the voltage state of its input rises above or falls below a predetermined level, the control means operating to connect a voltage to the input of a trigger circuit in response to an output signal therefrom signifying a change in the state thereof to return it to its former state.

It will be appreciated that more than two electrical quantities can be compared using a device embodying the invention wherein each quantity is associated with means to provide a corresponding varying electrical signal and with a respective detection means.

In order that the invention may be readily understood a specific embodiment thereof will now be described in more detail, by way of example, with reference to the accompanying drawing which is a circuit diagram of a device for comparing small currents.

In the embodiment illustrated in the drawing, the device compares the magnitudes of a plurality of currents which may differ from one another only by a small amount, e.g. as might be the case with currents through photodiodes subjected to different intensities of illumination.

In the drawing, the currents to be compared are indicated by $I_1, I_2, \ldots I_n$ and are arranged to discharge associated capacitors $C_1, C_2, \ldots C_n$, respectively. Each capacitor is also connected to the input of a respective inverter $R_1, R_2, \ldots R_n$ each of such inverters producing a logic output state which is an inverted form of the logic state applied to its input. The outputs of the inverters are respectively connected to SET inputs of associated bistable circuits A, B, ... N, the RESET input R of each bistable circuit being connected to a rail X. The output of each bistable circuit is connected to a corresponding input of an OR gate Y, the output of which is connected to a switch control circuit Z which can be operated to control switches $S_1, S_2, \ldots S_n$, to connect and disconnect capacitors $C_1, C_2, \ldots C_n$ respectively to a power rail V.

It should be noted that the inverters should draw negligible input currents otherwise these currents will alter the effective charging currents flowing to $C_1, C_2, \ldots C_n$. They are, therefore, most conveniently formed from MISTS or FETS.

In operation of the device, assuming at least one of the bistable circuits A, B, ... N, is SET, in which case the respective output $Q_A, Q_B, \ldots Q_N$, on terminal A, B, ... N respectively is in a logic 1 state, the output of OR gate Y is in a logic 1 state and this operates the switch control circuit Z to close all switches $S_1, S_2, \ldots S_n$ thereby to present a logic 1 state at the inputs of the invertors $R_1, R_2, \ldots R_n$. The inverter outputs are therefore switched into a logic 0 state. Thus, all the inverter outputs are in a logic 0 state which permits each bistable circuit to remain in its original state with a logic 0 state on all terminals A, B, ... N.

When a logic 1 state is applied (as a brief pulse) to rail X, and, therefore, to RESET input R, any bistable circuit which is SET (i.e. has a logic 1 output on terminal A, B, ... N) is RESET by the pulse and remains in such state in view of the logic 0 state output of the associated inverter. This ensures that each of the outputs $Q_A, Q_B, \ldots Q_n$, is now in a logic 0 state. Thus the output of OR gate Y assumes a logic 0 state which operates the switch control circuit Z to open switches $S_1, S_2, \ldots S_n$, to isolate capacitors $C_1, C_2, \ldots C_n$, from the voltage rail V. The capacitors $C_1, C_2, \ldots C_n$, then commence to discharge from the voltage to which they have been charged, and the inputs of inverters $R_1, R_2, \ldots R_n$ fall towards their logic 0 level, so that their outputs commence to rise to their logic 1 level. If the rates of rise are unequal (as would be the case if the capacitors were discharging through respective photodiodes illuminated by light of different intensities) causing a difference between $(I1/C_1)$ and $(I2/C_2)$, one inverter output will reach the logic 1 state corresponding to the SET condition of its following bistable circuit before the others. As soon as the particular bistable circuit concerned is SET, its output goes to a logic 1 state causing each of the switches $S_1, S_2, \ldots S_n$ to close recharging capacitors $C_1, C_2, \ldots C_n$ to voltage V, which, therefore, removes the SET signal from the output of the inverter associated with that bistable circuit. Thus, the device is now RESET in a stable condition ready to receive another pulse X. The bistable circuit which is SET (i.e. has a logic 1 state on its respective output terminal A, B, ... N) indicates that the associated current is the highest.

It will be appreciated that any number of currents or resistances may be compared by using the above device whilst the device may readily be modified to indicate which of the current values if the lowest rather than the highest.

In a practical embodiment of the device which is used for comparing light intensities, the circuit is in integrated form, the switches S, the inverters R, the bistable circuits A to N, the OR gate Y and the switch control circuit Z all being formed from MOS transistors, whilst I and C respectively, correspond to the photocurrents and stray capacitances of photodiodes in the same integrated circuit. Thus, the device compares photocurrents and, therefore, light intensities.

In an alternative form of the device, the inverters $R_1, R_2, \ldots R_n$ and the bistable circuits A, B, ... N, may be replaced by trigger circuits whose outputs go into a logic 1 state when their inputs drop below a predetermined voltage level and which outputs revert to a logic 0 state when their inputs rise above another, rather higher, predetermined voltage level. The device will then be free-running, producing new comparison outputs at regular intervals.

In operation of this alternative embodiment, if the output of at least one trigger circuit is in a logic 1 state, the capacitors will be charged as previously explained to the voltage V, the arrangement being such that such voltage is sufficient to switch the trigger output back to its logic 0 state. This switches off $S_1, S_2, \ldots S_n$ so that the capacitors commence to discharge. The first capacitor to discharge to the switching level of its associated trigger circuit causes that circuit's output to go to a logic 1 state which operates the switch control circuit to close all the switches, thus recharging all of the capacitors again until the trigger circuit output switches back to a logic 0 state, when the cycle of events is repeated. Thus the trigger circuit associated with the highest value of (I/C) produces a train of pulses at its output.

What we claim is:

1. A device for comparing the magnitudes of first and second electrical resistances, comprising means to provide simultaneously first and second electrical signal voltages which vary (increase or decrease) at a rate significant of the magnitude of the first and second electrical resistances respectively, said first and second electrical signal voltages being produced by charging or discharging respective capacitors through the first and second resistances simultaneously, first and second detection means to detect the first and second signal voltages respectively, each such detection means having an output at which an output signal is produced when the respective one of the first and second signal voltages attains a predetermined value, and means connected to the outputs of the first and second detection means and operative, on receipt of an output signal from one of the detection means, to prevent a subsequent output signal being produced by the other detection means, said last mentioned means comprising control means operative to reset the device, by fully charging or discharging the capacitors, on receiving the output signal from the said one detection means.

2. A device according to claim 1, wherein the first and second detection means each include a bistable circuit whose output state changes to produce the output signal when the respective voltage attains the said predetermined value.

3. A device according to claim 2, wherein the output of each bistable circuit is connected to a respective input of an OR gate the output of which is connected to the reset means.

4. A device according to claim 1, wherein the first and second detection means each include a trigger circuit the output state of which changes when the voltage state of its input rises above or falls below a predetermined level, the control means operating to connect a voltage to the input of a trigger circuit in response to an output signal therefrom signifying a change in the state thereof to return it to its former state.

5. A device according to any one of claim 1 wherein the first and second resistances are the resistances of respective photodiodes whereby to compare the intensity of illumination incident on the photodiodes.

* * * * *